United States Patent
Guan et al.

(10) Patent No.: US 10,339,033 B2
(45) Date of Patent: *Jul. 2, 2019

(54) RUNTIME DETECTION OF UNINITIALIZED VARIABLE ACROSS FUNCTIONS

(71) Applicant: INTERNATIONAL BUSINESS MACHINES CORPORATION, Armonk, NY (US)

(72) Inventors: Xiao Feng Guan, Shanghai (CN); JiuFu Guo, Shanghai (CN); Yu Xuan Zhang, Shanghai (CN); Yuheng Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,387

(22) Filed: Dec. 4, 2017

(65) Prior Publication Data
US 2018/0095864 A1    Apr. 5, 2018

Related U.S. Application Data

(63) Continuation of application No. 15/285,861, filed on Oct. 5, 2016, which is a continuation of application No. 15/161,526, filed on May 23, 2016, now Pat. No. 9,886,368.

(51) Int. Cl.
G06F 11/36        (2006.01)

(52) U.S. Cl.
CPC ................... *G06F 11/3672* (2013.01)

(58) Field of Classification Search
None
See application file for complete search history.

(56) References Cited

U.S. PATENT DOCUMENTS

| | | | |
|---|---|---|---|
| 6,725,187 | B1 | 4/2004 | Cheng et al. |
| 7,487,321 | B2 | 2/2009 | Muthiah et al. |
| 9,183,114 | B2 | 11/2015 | Rangarajan et al. |
| 2002/0010911 | A1 | 1/2002 | Cheng et al. |
| 2006/0143527 | A1* | 6/2006 | Grey ................... G06F 11/3672 714/33 |

(Continued)

OTHER PUBLICATIONS

Nguyen et al., "Automatic Detection of Uninitialized Variables", SpringerLink, International Conference on Compiler Construction, First Online: Feb. 28, 2003, Conference paper, Abstract, 7 pages.

(Continued)

*Primary Examiner* — Daxin Wu
(74) *Attorney, Agent, or Firm* — Kenneth Han (57) ABSTRACT

The disclosure provides a method for detection of an uninitialized variable. The method includes running a first function, wherein the first function comprises a local variable and a first flag associated with the local variable for indicating an initialization state of the local variable; calling a second function from the first function, with the local variable as a parameter of the second function, wherein the second function comprises a second flag associated with the parameter for indicating an initialization state of the parameter; and updating the first flag based at least on the second flag returned from the second function.

20 Claims, 5 Drawing Sheets

(56) References Cited

U.S. PATENT DOCUMENTS

| | | | |
|---|---|---|---|
| 2007/0150879 A1* | 6/2007 | Rangarajan | G06F 9/44589 |
| | | | 717/154 |
| 2008/0216061 A1* | 9/2008 | Allen | G06F 9/449 |
| | | | 717/142 |
| 2008/0244536 A1* | 10/2008 | Farchi | G06F 8/433 |
| | | | 717/130 |
| 2012/0311533 A1 | 12/2012 | Fanning et al. | |
| 2014/0130016 A1 | 5/2014 | Menghrajani et al. | |
| 2015/0309776 A1 | 10/2015 | Bates et al. | |
| 2017/0147475 A1 | 5/2017 | Abadi et al. | |
| 2017/0337119 A1 | 11/2017 | Guan | |
| 2017/0337120 A1 | 11/2017 | Guan et al. | |

OTHER PUBLICATIONS

IBM, List of IBM Patents or Patent Applications Treated as Related, Appendix P, dated Dec. 21, 2017, 2 pages.

\* cited by examiner

RUNTIME DETECTION OF UNINITIALIZED VARIABLE ACROSS FUNCTIONS

BACKGROUND

The present disclosure relates to computer programming, and more specifically to detection of uninitialized variables.

In computer programming, an uninitialized variable is a variable that is declared but is not set to a definite value. During program execution, an uninitialized variable will generally have an unpredictable value. As such, a use of a variable before its initialization is a programming error and a common source of bugs in software, and will sometimes cause more severe results than software crash.

A compiler is a computer program that translates source code from a high level programming language to a lower level language such as assembly language or machine code. Some compilers provide functionality of detecting uninitialized variables and reporting them as compile-time errors. These compilers usually perform static data flow analysis on program source code at a compile time

SUMMARY

Disclosed herein are embodiments of a method, computing system and computer program product for runtime detection of an uninitialized variable across functions.

According to one embodiment of the present invention, there is provided a computer-implemented method. The method includes running a first function, wherein the first function comprises a local variable and a first flag associated with the local variable for indicating an initialization state of the local variable, and calling a second function from the first function, with the local variable as a parameter of the second function. The second function comprises a second flag associated with the parameter for indicating an initialization state of the parameter. The method further includes updating the first flag based at least on the second flag returned from the second function.

According to another embodiment of the present invention, there is provided a computing system comprising a processor and a computer-readable memory unit coupled to the processor. The memory unit includes instructions that when executed by the processor perform actions of running a first function, wherein the first function comprises a local variable and a first flag associated with the local variable for indicating an initialization state of the local variable; calling a second function from the first function, with the local variable as a parameter of the second function, wherein the second function comprises a second flag associated with the parameter for indicating an initialization state of the parameter; and updating the first flag based at least on the second flag returned from the second function.

According to still another embodiment of the present invention, there is provided a computer program product comprising a computer readable storage medium having program instructions embodied therewith. The program instructions are executable by a processor to cause the processor to run a first function, wherein the first function comprises a local variable and a first flag associated with the local variable for indicating an initialization state of the local variable; call a second function from the first function, with the local variable as a parameter of the second function, wherein the second function comprises a second flag associated with the parameter for indicating an initialization state of the parameter; and update the first flag based at least on the second flag returned from the second function.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
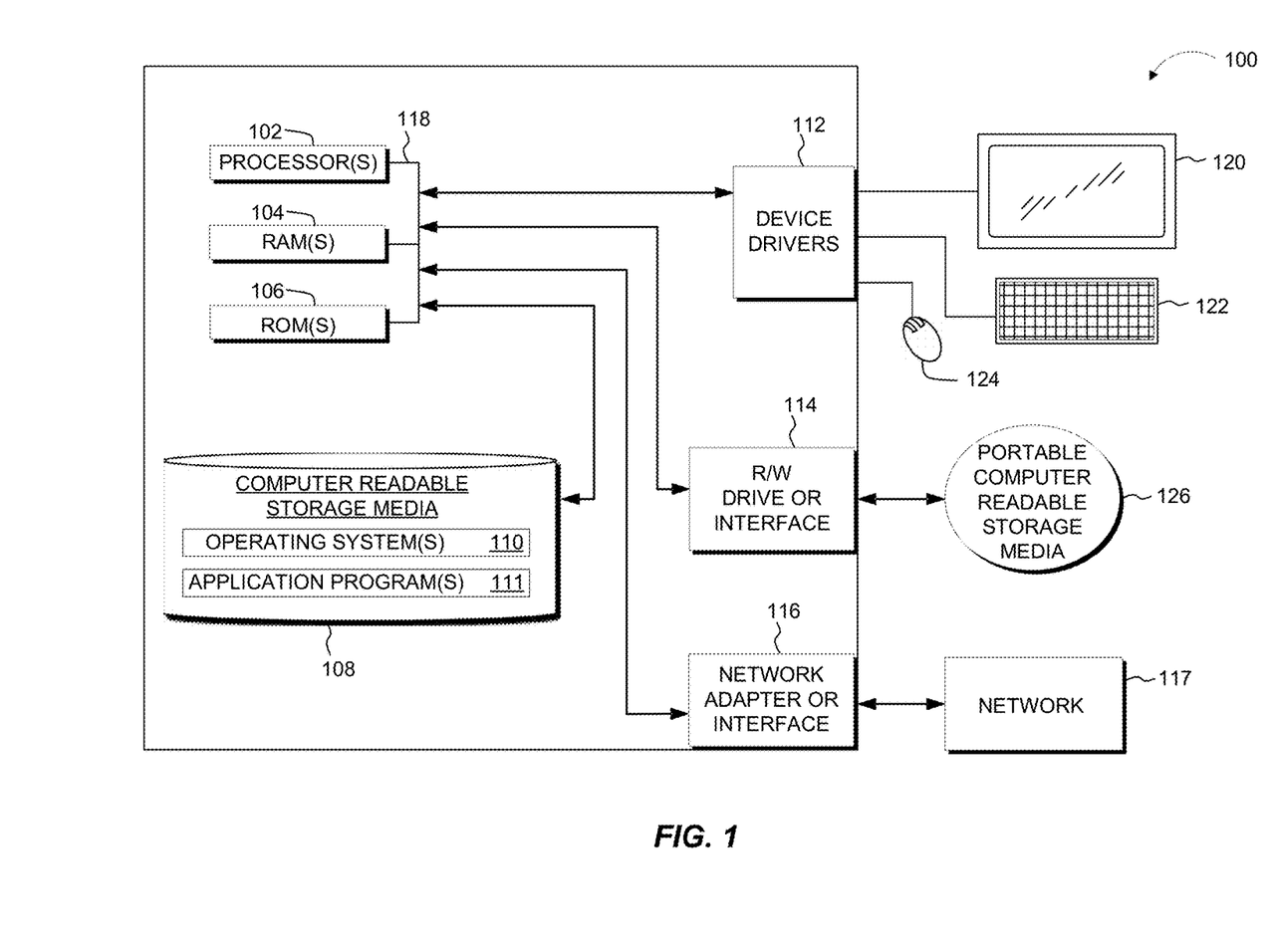
FIG. 1 shows an exemplary computer system, which is applicable to implement the embodiments of the present invention.

The present invention will now be described in detail with reference to the Figures. FIG. 1 shows an exemplary computer system, designated generally as computer system 100, which is applicable to implement the embodiments of the present invention. It should be appreciated that FIG. 1 provides only an illustration of one implementation and does not imply any limitations with regard to the environments in which different embodiments may be implemented. Many modifications to the depicted environment may be made.

Computer system 100 may include one or more processors 102, one or more computer-readable RAMs 104, one or more computer-readable ROMs 106, one or more computer readable storage media 108, device drivers 112, read/write drive or interface 114, network adapter or interface 116, all interconnected over a communications fabric 118. Communications fabric 118 may be implemented with any architecture designed for passing data and/or control information between processors (such as microprocessors, communications and network processors, etc.), system memory, peripheral devices, and any other hardware components within a system.

One or more operating systems 110 and one or more application programs 111 are stored on one or more of the computer readable storage media 108 for execution by one or more of the processors 102 via one or more of the respective RAMs 104 (which typically include cache memory). In the illustrated embodiment, each of the computer readable storage media 108 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computer system 100 may also include a R/W drive or interface 114 to read from and write to one or more portable computer readable storage media 126. Application programs 111 on computer system 100 may be stored on one or more of the portable computer readable storage media 126, read via the respective R/W drive or interface 114 and loaded into the respective computer readable storage media 108.

Computer system 100 may also include a network adapter or interface 116, such as a TCP/IP adapter card or wireless communication adapter (such as a 4G wireless communication adapter using OFDMA technology) for connection to a network 117. Application programs 111 on computer system 100 may be downloaded to the computing device from an external computer or external storage device via a network (for example, the Internet, a local area network or other wide area network or wireless network) and network adapter or interface 116. From the network adapter or interface 116, the programs may be loaded onto computer readable storage media 108. The network may comprise copper wires, optical fibers, wireless transmission, routers, firewalls, switches, gateway computers and/or edge servers.

Computer system 100 may also include a display screen 120, a keyboard or keypad 122, and a computer mouse or touchpad 124. Device drivers 112 interface to display screen 120 for imaging, to keyboard or keypad 122, to computer mouse or touchpad 124, and/or to display screen 120 for pressure sensing of alphanumeric character entry and user selections. The device drivers 112, R/W drive or interface 114 and network adapter or interface 116 may comprise hardware and software (stored on computer readable storage media 108 and/or ROM 106).

Network 117 can be, for example, a local area network (LAN), a wide area network (WAN) such as the Internet, or a combination of the two, and can include wired, wireless, or fiber optic connections. In general, network 117 can be any combination of connections and protocols that will support communications between computer system 100 and other devices.

Embodiments of the present invention may be implemented in the computer system/server 12 of FIG. 1. Now, with reference to FIGS. 2-5, some embodiments of the present invention will be described below.

As described above, some compilers perform static data flow analysis on the program source code at compile time. However, it is difficult for the static analysis to detect variable uninitialization in many cases. For example, in the case where the execution of initialization operation of a local variable depends on a condition that can be determined only at runtime, it is usually hard at compile time to determine the initialization state of the local variable. Furthermore, existing methods for uninitialization detection do not address how to detect uninitialized variables across functions although function calling is common in programming. Therefore, existing methods for uninitialization detection are relatively low in accuracy.

The disclosure of the present invention will describe embodiments of a method, computing system and computer program product for runtime detection of variable uninitialization across functions. It should be appreciated that, the term "function" used here may refer to any subroutine in any programming language, although it may be called a procedure, a routine, a method or a subprogram in different programming languages.

Figure 2:
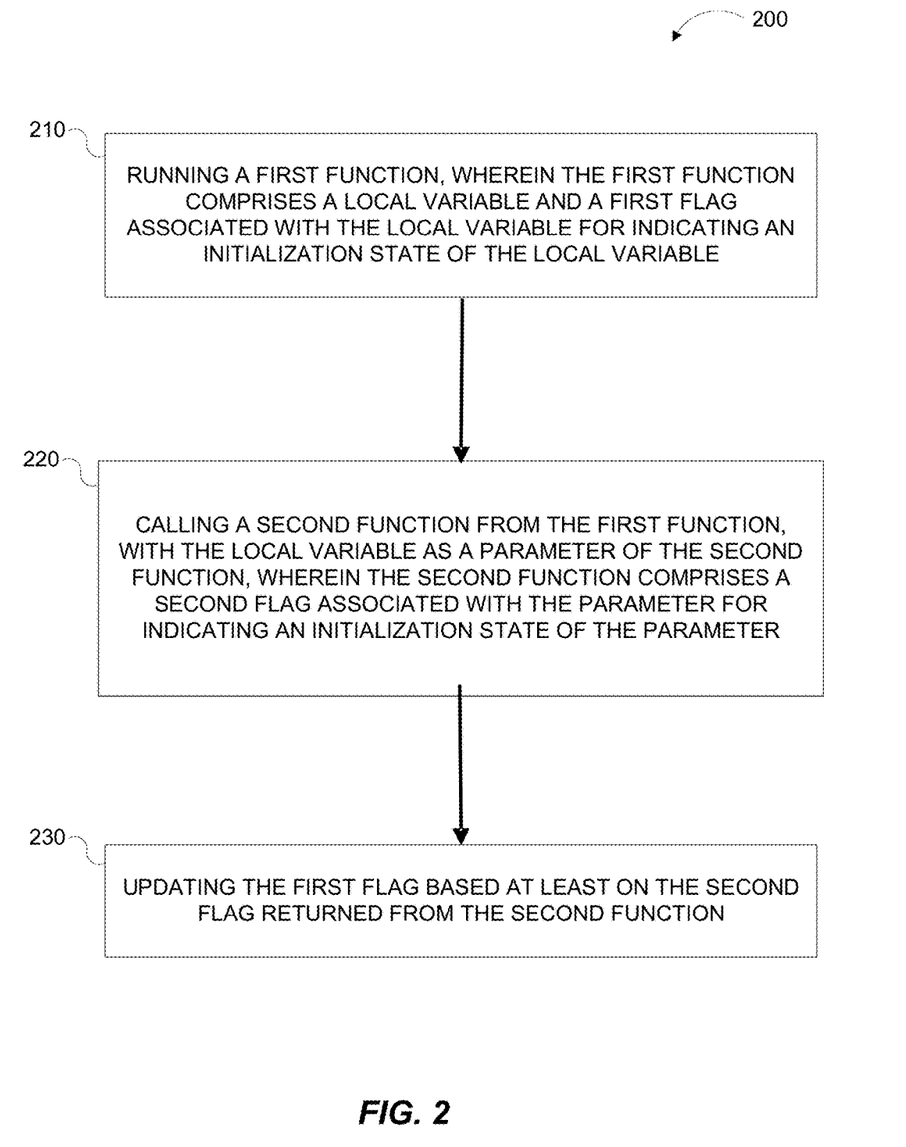
FIG. 2 depicts a flow chart illustrating a method for detecting an uninitialized variable across functions according to some embodiments of the present invention.

With reference now to FIG. 2, FIG. 2 is a flow chart illustrating a method 200 for detecting an uninitialized variable across functions according to some embodiments of the present invention. Method 200 may be performed at runtime for a computer program, which includes at least a function call. Some steps of method 200 may be performed by executing extra program codes inserted by a compiler during compilation of the source code of the computer program. For example, the compiler may insert codes into the source code to enable method 200 at runtime. As another example, the compiler may insert logic into the intermediate result during the compilation of the source code to enable method 200 at runtime. It should be appreciated that the method according to the present invention can be applicable to various programming languages, for example, but not limited to, C, C++, FORTRAN and so on.

At step 210, method 200 may include running a first function, wherein the first function comprises a local variable and a first flag associated with the local variable for indicating an initialization state of the local variable. In an embodiment, the first function may be the main function of the computer program. Alternatively, the first function may be a function that is called by another function of the computer program. It should be appreciated that, the term "flag" used here may refer to any indicator that can be used to indicate an initialization state of a variable or a parameter. The flag may work like an anonymous local variable which takes a memory space (e.g., in a stack).

The local variable is a variable included in the source code of the first function, while the first flag may be inserted by the compiler into the first function during its compilation for the purpose of indicating the initialization state of the local variable. Here, the "initialization state" of the local variable means whether the local variable has been initialized, i.e., whether the local variable has been set to a definite value. Accordingly, the first flag may have two possible values: 0 (or "false"), representing the local variable is uninitialized, and 1 (or "true"), representing the local variable has been initialized. In an embodiment, the first flag may be initially set to 0, and is set to 1 in response to an initialization of the local variable. The term "initialization" here refers to the assignment of an initial value for a local variable at runtime. The setting of the first flag may be performed by extra codes inserted by the compiler during the compilation. For example, the compiler may insert codes during compilation to define a first flag with an initial value of 0. The compiler may further insert codes into the source code wherever there is an assignment statement for the local variable, even though the statement might not be executed at runtime if, e.g., the precondition for the statement is not satisfied. As a result, if an initialization of the local variable occurs at runtime, the first flag will be set to "1". Once the first flag is set to "1", it will keep unchanged.

According to an embodiment, the compiler may configure a flag for each of a plurality of local variables in the first function during the compilation to indicate its initialization state, such that the initialization state of all of the local variables may be detected. Alternatively, the flag may be selectively inserted for some of the local variables according to the actual needs.

In step 220, during the execution of the first function, the first function may call a second function, with the local variable of the first function as a parameter of the second function. Here, the local variable is passed to the second function in a way that changes to the parameter will be reflected in the local variable. For example, the local variable may be passed to the second function by reference or by address, as is well known in the art. As a specific example, in the following code segments, "b" is a local variable of the first function (hereinafter also referred to "the caller"), and "pb" is a parameter of the second function (hereinafter also referred to "the callee") corresponding to the local variable "b". The local variable "b" is passed to the callee by reference, i.e., using "&pb", as shown below:

```
caller ( ) {
    int b;
    ...
    callee (b);
    ...
}
......
callee (int &pb) {
    ...
}
```

The second function may comprise a second flag associated with the parameter corresponding to the local variable, for indicating the initialization state of the parameter. Like the first flag, the second flag may also have two possible values, 0 or 1, to respectively represent that the parameter is uninitialized or has been initialized.

According to an embodiment of the present invention, the first flag is not passed to the second function. In such a case, the second flag may be initially set to 0, and is set to 1 in response to an initialization of the parameter in the second function. A more specific example will be described later with reference to FIG. 3.

According to another embodiment of the present invention, the first flag may be passed to the second function. For example, the first flag may be put into a stack frame associated with the second function before making the call, which will be fetched from the stack frame during the execution of the second function according to a predetermined convention between the first and second functions. The passing of the first flag may be realized by extra codes inserted by the compiler during the compilation, and the convention may be defined by the compiler. In this embodiment, the second flag may be initially set based at least on the first flag, and is set to 1 in response to an initialization of the parameter in the second function. A more specific example will be described later with reference to FIG. 5.

In the above embodiments, the setting of the second flag may be performed by extra codes inserted by the compiler during the compilation, which is similar to the first flag and thus the description thereof is omitted. If multiple local variables are passed to the second function from the first function as parameters, the second function will be provided with multiple second flags respectively in association with the parameters. Moreover, besides the flags for the parameters, the compiler may also provide a flag for a local variable (if any) of the second function. Similarly, in the case that the first function is not the main function and thus may be a callee, the first function may be further provided with flag(s) associated with parameter(s) passed from the caller, for indicating the initialization state of the parameter(s). In other words, each function, no matter whether it is the first function (caller) or the second function (callee), may be provided with flags for local variables as well as flags for parameters.

In step to 230, the first flag in the first function may be updated based at least on the second flag returned from the second function. For example, if the returned second flag shows that the parameter has been initialized during the execution of the second function, the first flag associated with the corresponding local variable is set to 1, regardless of its previous value. More specifically, the first flag will be set to 1 if the second flag is 1, and will be unchanged if the second flag is 0. The updating may be performed by extra codes inserted by the compiler in a position of the first function after the function call. As such, the updated first flag may indicate the initialization state of the local variable with both the caller and callee functions having been checked. Therefore, a runtime detection of uninitialization is enabled across functions, which can increase the accuracy of uninitialization detection.

A more specific example of uninitialization detection across functions will be described with reference to FIG. 3. The method of FIG. 3 may be performed at runtime for a computer program including at least a function call, and may be performed by executing extra program codes inserted by a compiler during compilation of the source code of the computer program.

Figure 3:
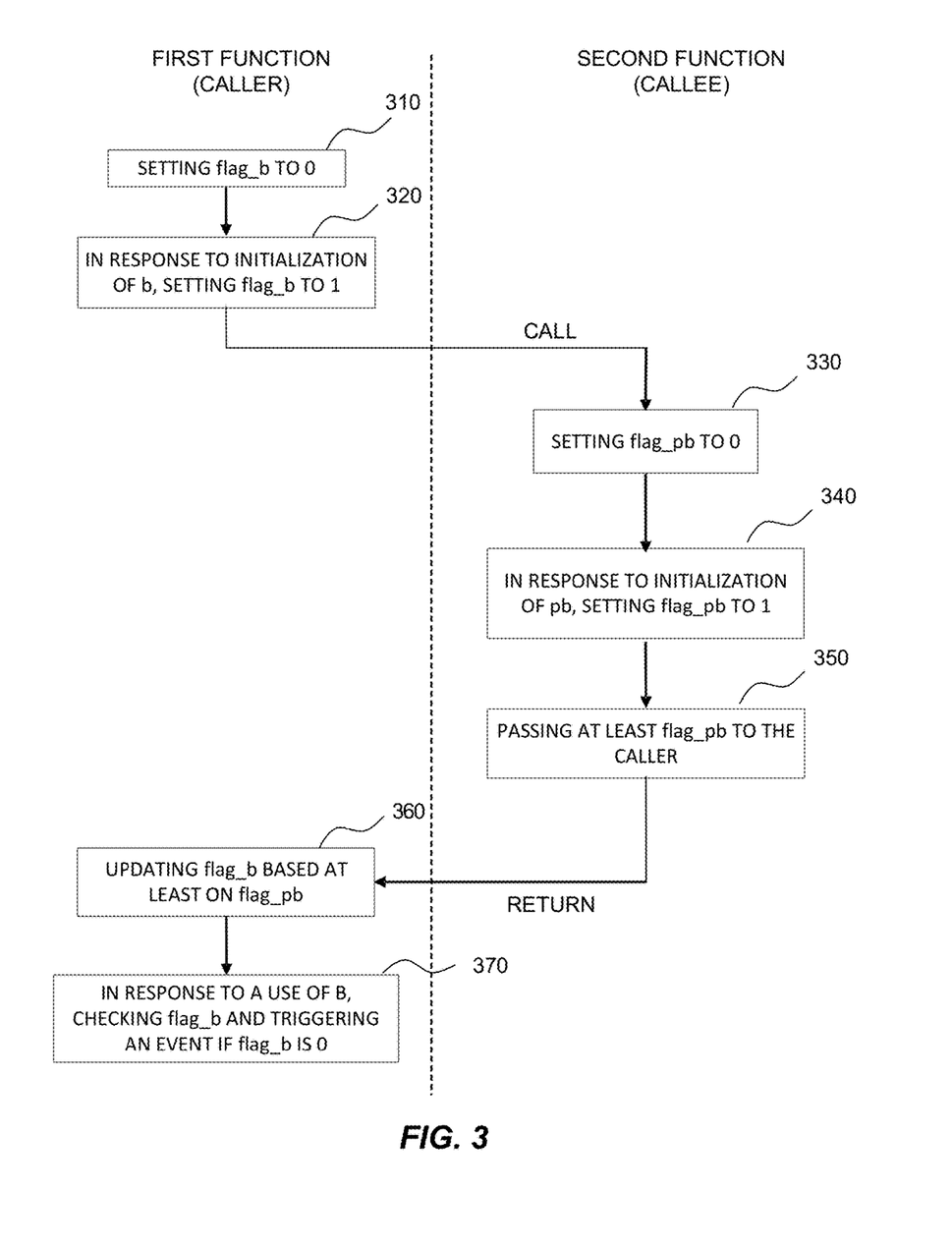
FIG. 3 depicts an example of uninitialization detection across functions according to embodiments of the present invention.

In FIG. 3 under "First Function (Caller)" the operations performed in the first function, i.e., the caller, while under "Second Function (Callee)" shows the operations performed in the second function, i.e., the callee. In the example of FIG. 3, the first flag associated with the local variable in the first function is not passed to the second function, and the second function comprises a second flag associated with the parameter corresponding to the local variable. In the following descriptions, "b" and "pb" will respectively refer to the local variable in the first function and the corresponding parameter in the second function, and "flag_b" and "flag_pb" will respectively refer to the first flag associated with "b" and the second flag associated with "pb".

At block 310, flag_b is initially set to 0, indicating that b is uninitialized. At block 320, during the execution of the caller, if an initialization of b occurs, flag_b will be set to 1 indicating that b has been initialized. Otherwise, flag_b will not change in its value. It should be appreciated that, although block 320 is shown in FIG. 3 to be prior to a function call indicated by the arrowed line from block 320 to block 330, the operation of block 320 can be performed any time when an initialization of b occurs during the execution of the first function. For example, it can be also performed after block 360. It should be also appreciated that, there may be other operations between block 310 and the function call, depending on the program instructions contained in the caller.

During the execution of the caller, it may call another function, i.e., the callee, as shown in FIG. 3. Blocks 330-350 are performed in the callee in response to the function call, in which the local variable b is passed as a parameter pb of the second function. As mentioned above, b is passed to the callee in such a way that changes to pb in the callee will be reflected in b in the caller.

At block 330, flag_pb associated with the parameter pb is initially set to 0, indicating that pb is uninitialized, regardless of the initialization state of the local variable b in the caller.

At block 340, during the execution of the callee, if an initialization of pb occurs, flag_pb will be set to 1, which indicates that pb has been initialized. Otherwise, flag_pb will not change its value. It should be appreciated that, block 340 can be performed any time when an initialization of pb occurs during the execution of the callee. It should be also appreciated that, there may be other operations before and after block 340 depending on the program instructions contained in the callee.

At block 350, at least flag_pb is passed to the caller at the end of the callee. According to an embodiment, flag_pb may be passed to the caller via a stack according to a predetermined convention between the caller and the callee. The passing of flag_pb may be realized by extra codes inserted by the compiler during the compilation, and the convention may be defined by the compiler.

It is well known in the art that a stack is a data structure commonly used for storing information about active functions of a computer program. The information includes, e.g., return address, parameters, local variables, and so on. The stack is composed of stack frames. Each stack frame corresponds to a call to a function that has not yet terminated with a return.

In an exemplary embodiment, passing flag_pb via the stack will be described below with reference to FIG. 4A, which shows an exemplary stack at the end of the callee. In this embodiment, flag_pb is passed to the caller by putting flag_pb into a stack frame associated with the callee at the end of the callee according to a predetermined convention between the caller and the callee.

Figure 4A:
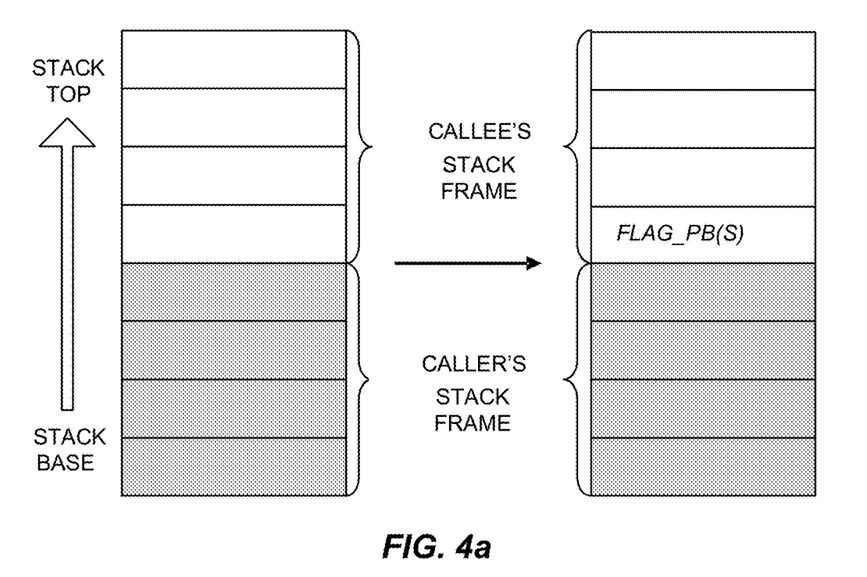
FIGS. 4A and 4B depict exemplary stack layouts during the function call according to some embodiments of the present invention.

In FIG. 4A, the direction of stack growth is upwards, as shown by the leftmost arrow. The stack frame associated with the callee (hereinafter referred to as "the callee's stack frame") is on top of the stack frame associated with the caller (hereinafter referred to as "the caller's stack frame"). The left stack of FIG. 4A shows the stack layout at the time when the program instructions contained in the callee other than the extra codes inserted by the compiler at the end of the callee have been executed. It can be seen that the callee's stack frame has been released or is ready to be released. In other words, the callee's stack frame would have been useless at this point of time. According to an embodiment of the present invention, flag_pb is then put into the callee's stack frame by executing the extra codes inserted by the compiler. If there is more than one flag associated with the parameters in the callee, these flags will be put into the stack frame sequentially according to a predetermined convention between the caller and the callee. The right stack of FIG. 4A depicts an example of the stack layout where flag_pb has been put in the callee's stack frame.

After putting flag_pb and other data, if any, into the callee's stack frame, the function call returns. Upon the return of the callee, flag_pb and the other data temporarily stored in the callee's stack frame are fetched by the caller according to the predetermined convention. Therefore, by utilizing the callee's stack frame at the end of the callee to pass flag_pb, the otherwise useless callee's stack frame is reused without breaking existing conventions of function calling.

It should be appreciated that although flag_pb as illustrated is at the bottom of the callee's stack frame in FIG. 4A, it can be put elsewhere in the callee's stack frame according to the convention between the caller and the callee, and there is no limitation to the position of flag_pb and the layout of the stack. Moreover, it should be appreciated that there may be other data that need to be put into the callee's stack frame in addition to the flags, an example of which will be described below in reference to FIG. 4B.

It should be appreciated that, although the passing of flag_pb to the caller has been described above as via the stack, flag_pb can also be passed to the caller via other ways. For example, a register or other storage units can be used to pass flag_pb, which will also not break existing conventions of function calling.

Referring to FIG. 3, at block 360, flag_b is updated based at least on flag_pb. For example, flag_b will be set to 1 if flag_pb is 1, and will be unchanged if flag_pb is 0.

According to an embodiment of the present invention, a global variable may be provided to indicate the availability of flag_pb to the caller. In the case where flag_pb is passed to the caller via the callee's stack frame, the global variable may indicate the existence of flag_pb in the callee's stack frame. For example, the global variable may be set to 1 once flag_pb is put into the stack, indicating that flag_pb is available to the caller. Accordingly, at block 360 of FIG. 3, the value of the global variable may be checked, and if the global variable indicates flag_pb is available to the caller, flag_b will be updated based on flag_pb. Then, the global variable is reset to 0 so that the global variable will be used for the next function call. On the other hand, if the global variable indicates flag_pb is unavailable, e.g., with a value of 0, the method will not fetch data from the stack upon the return of the callee and accordingly will not update flag_b. Again, the provision of the global variable and the above-described determination at block 360 may be realized by extra codes inserted by the compiler.

The provision of the global variable may help to address the compatibility issue when a callee is a legacy function that will not return a result to indicate the initialization state of the parameter. For example, the caller may have flag_b according to the present invention, while the callee may be a legacy function without flag_pb. In this case, errors might occur should the caller attempts to fetch data from the stack to update flag_b upon the return of the callee. As described above, the provision of the global variable can be advantageous to address this issue.

Figure 4B:
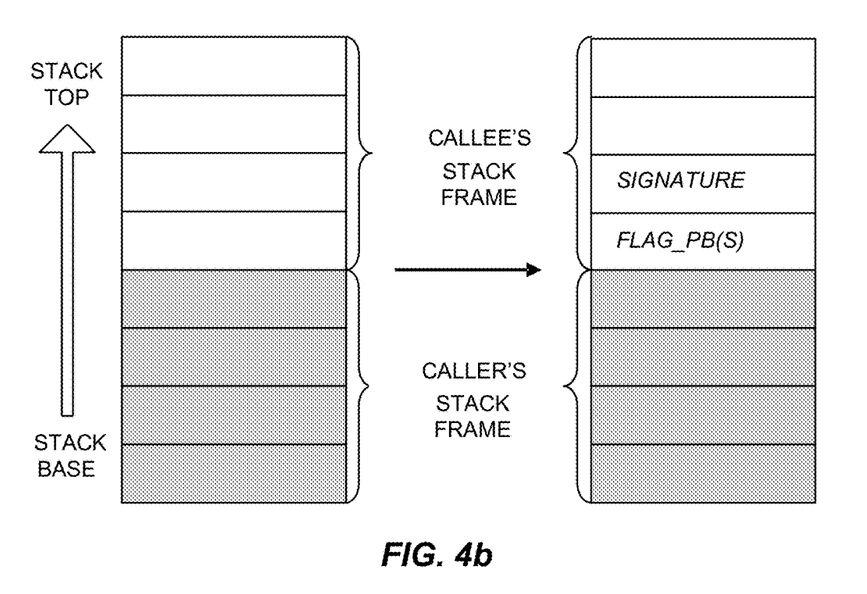

In addition or as an alternative to the global variable, a signature can be provided for the callee to address the compatibility issue according to an embodiment of the present invention. The signature can be passed from the callee to the caller along with flag_pb. According to an embodiment, the signature can also be passed via the stack. For example, the signature can be put into the callee's stack frame along with flag_pb (e.g., before or after flag_pb, depending on the convention between the caller and callee) at the end of the callee, as shown in FIG. 4B. Thus the existence of the signature in the stack can ensure the availability of flag_pb in the stack. It should be appreciated that although flag_pb and the signature are illustrated at the bottom of the callee's stack frame in FIG. 4B, they can be put elsewhere in the callee's stack frame according to the convention between the caller and callee, and there is no limitation to the positions of flag_pb and signature and the layout of the stack. As an alternative to the stack, a register or other storage units can be used to pass the signature. Accordingly, at block 360 of FIG. 3, the method may verify the signature and, if the verification is successful, update flag_b based on flag_pb. On the other hand, if the verification is failed, flag_b will not be updated. The provision of the signature and the above-described determination at block 360 may be realized by extra codes inserted by the compiler.

According to an embodiment, the signature can be a value specific to the callee and/or a value specific to the caller. For example, the signature can be the return address of the callee, and the verification operation can check whether the return address of the callee matches the corresponding address in the caller. According to another embodiment, the signature can be a predetermined value known by all the functions, and the verification operation can check whether the data fetched from the stack is the predetermined value.

Those skilled in the art should appreciate that verification of signature is particularly useful for nested function calls with mixed use of legacy functions without the present invention, e.g., those functions without a flag configured at time of compilation to indicate the initialization state of a parameter, and functions according to the present invention, as the signature can be used to check the availability of the flag of the callee that is directly called by the caller. For example, consider a case where a first function calls a second function, the second function in turn calls a third function and the first and the third functions are both functions according to the present invention while the second function is a legacy function. Upon return of the second function, the first flag of the first function should not be updated since the second legacy function did not provide any second flag. The global variable might have been set to 1 at the end of the third function, while in contrast, the verification of the signature of the second function will fail, which avoids the updating of the first flag by mistake. It should be appreciated that, the global variable and the signature can be used separately or in combination for the compatibility consideration.

Referring again to FIG. 3, after updating flag_b, the execution of the caller can continue. As mentioned above, although not shown in FIG. 3, if an initialization of b does not occur until after the function call, flag_b may be changed to 1 after block 360. At block 370, according to an embodiment, if there is a use of b during the execution of the caller, the method may check flag_b. If flag_is 0, i.e., the checking result indicates an occurrence of "use before initialization" of the local variable b, an event may be triggered. The event can be, for example, a trap or a warning to alert the occurrence of "use before initialization". Here, the use of b refers to any operation that uses the value of b. If b has not been initialized, its use may cause uncertain results. The checking and triggering at block 370 may be realized by the compiler inserting extra code into the caller wherever there is a possible use of b, such that if the "use before initialization" of b occurs at runtime, a corresponding event will be triggered. It should be appreciated that, although block 370 is shown in FIG. 3 after block 360, it can be performed any time when a use of b occurs during the execution of the caller. For example, it can be also performed before the function call. It should also be appreciated that, there may be other operations between blocks 360 and 370 and after block 370, depending on the program instructions contained in the caller.

Figure 5:
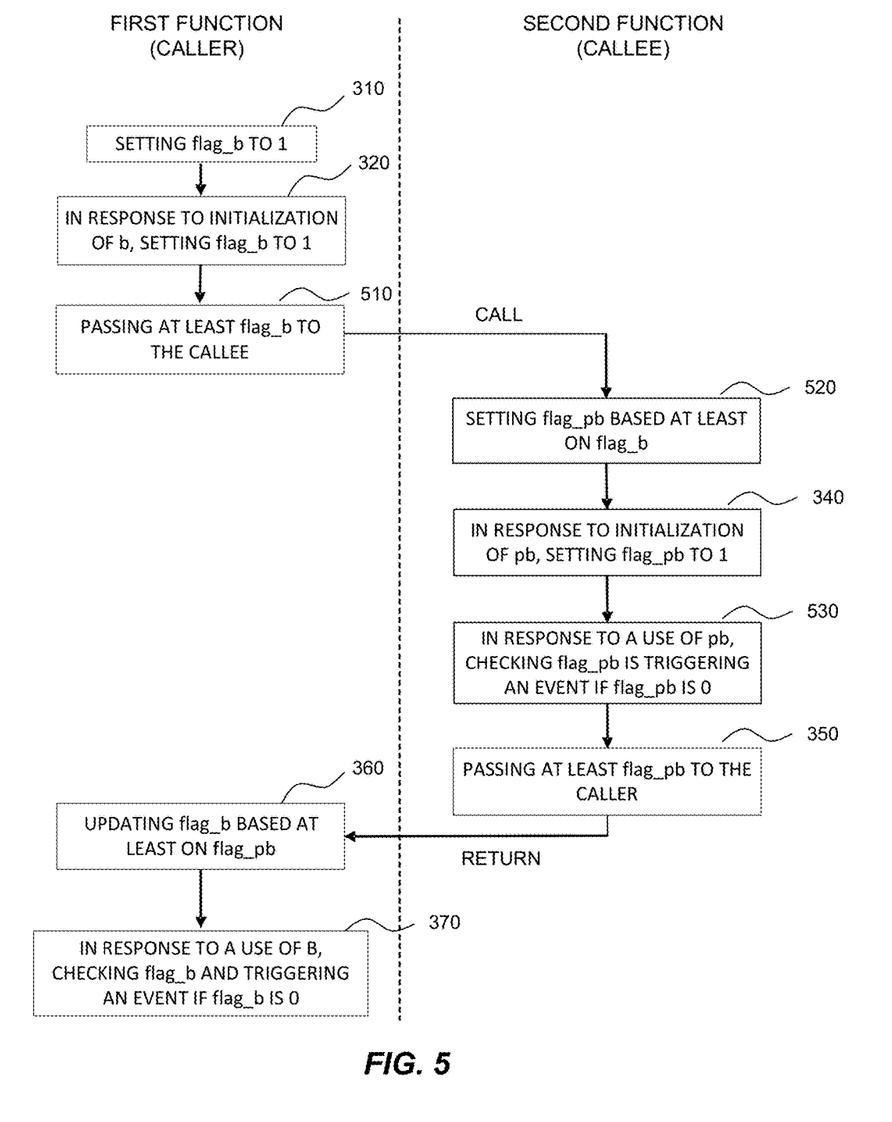
FIG. 5 depicts an example of uninitialization detection across functions according to some embodiments of the present invention.

Referring to FIG. 5, FIG. 5 depicts an example of uninitialization detection across functions according to some embodiments of the present invention. The method of FIG. 5 may be performed at runtime for a computer program including at least a function call, and may be performed by executing extra program codes inserted by a compiler during compilation of the source code of the computer program.

In the descriptions with respect to FIG. 5, similar to FIG. 3, "caller" and "callee" will be used to refer to the first and second functions, "b" and "pb" will be used to refer to the local variable in the first function and the corresponding parameter in the second function, and "flag_b" and "flag_pb" will be used to refer to the first and second flags associated with the local variable "b" and the parameter "pb" respectively.

Some steps in FIG. 5 are the same as those in FIG. 3 and are referenced with the same numbers; the description thereof will be omitted. As seen in reference to FIG. 5, flag_b is passed to the callee, and the initial value of flag_pb in the callee is set based at least on flag_b, instead of set to 0. With this change, the occurrence of "use before initialization" for the parameter pb can be detected in the callee.

As shown at block 510 in FIG. 5, just before the function call, flag_b, which indicates the initialization state of the local variable b of the caller, is passed to the callee. According to an embodiment, flag_b can be put into the callee's stack frame before the function call and fetched from the callee's stack frame at the beginning of the callee according to a predetermined convention between the caller and the callee. According to an embodiment, a global variable can be provided to indicate the availability of flag_b in a way similar to the above-mentioned global variable for flag_pb, in consideration of the compatibility with legacy code. Alternatively or in addition, a signature of the caller can be put into the stack along with flag_b for verification by the callee, which is similar to the signature of the callee as described above. Then the caller calls the callee.

As shown in block 520, the initial value of flag_pb can be set based at least on flag_b, such that the initialization state of b before the call can be known by the callee. For example, flag_pb can be initially set to be equal to flag_b. Further, in the case that the global variable and/or the signature has been provided for the caller, the initial value of flag_pb is set based on flag_b if the global variable indicates that flag_b is available and/or the signature is successfully verified; otherwise, the initial value of flag_pb is set to 0. According to an embodiment, block 520 can be performed at the beginning of the callee so as not to break the existing calling convention.

Then the execution of the callee will continue. As shown in block 340, similar to FIG. 3, during the execution of the callee, if an initialization of pb occurs, flag_pb will be set to 1, which indicates that pb has been initialized. Otherwise, flag_pb will not change its value.

As shown in block 530, if there is a use of pb during the execution of the callee, the method may check flag_pb. If flag_pb is 0, i.e., the checking result indicates an occurrence of "use before initialization" of the parameter pb, an event may be triggered. The event can be, for example, a trap or a warning to alert the occurrence of "use before initialization". The checking and triggering at block 520 may be realized by the compiler inserting extra code into the callee wherever there is a possible use of pb, such that if the "use before initialization" of pb occurs at runtime, a corresponding event will be triggered. Therefore, with the knowledge of the initialization state of the local variable b in the caller before the call, the "use before initialization" of the corresponding parameter pb in the callee can be detected. It should be appreciated that, although block 530 is shown in FIG. 5 as following block 340, it can be performed any time when a use of the parameter pb occurs during the execution of the callee. For example, it may be performed before block 340.

Then the execution of the callee will continue. It should also be appreciated that, there may be other operations during the execution of the callee, depending on the program instructions contained in the callee. At the end of the callee, at least flag_pb is passed to the caller, as shown at block 350.

The operations in blocks 350-370 are the same as those in FIG. 3 and will not be described.

The present invention may be a system, a method, and/or a computer program product. The computer program product may include a computer readable storage medium (or media) having computer readable program instructions thereon for causing a processor to carry out aspects of the present invention.

According to an embodiment of the present invention, there is provided a computing system comprising a processor and a computer-readable memory unit coupled to the processor. The memory unit may include instructions that when executed by the processor perform actions of running a first function, wherein the first function comprises a local variable and a first flag associated with the local variable for indicating an initialization state of the local variable; calling a second function from the first function, with the local variable as a parameter of the second function, wherein the second function comprises a second flag associated with the parameter for indicating an initialization state of the parameter; and updating the first flag based at least on the second flag returned from the second function.

According to an embodiment of the computing system, wherein during execution of the second function, the second flag is initially set to indicate the parameter is uninitialized, and is set to indicate the parameter has been initialized in response to an initialization of the parameter.

According to an embodiment of the computing system, wherein updating the first flag based at least on the second flag returned from the second function comprises: setting the first flag to indicate the local variable has been initialized if the returned second flag indicates the parameter has been initialized; and keeping the first flag unchanged if the returned second flag indicates the parameter is uninitialized.

According to an embodiment of the computing system, wherein the second flag is returned to the first function by putting the second flag into a stack frame associated with the second function at an end of the second function according to a predetermined convention between the first and second functions.

According to an embodiment of the computing system, wherein a global variable is provided to indicate availability of the second flag to the first function, and wherein the first flag is updated in response to the global variable indicating the second flag is available to the first function.

According to an embodiment of the computing system, wherein a signature of the second function is returned to the first function along with the second flag, and wherein the first flag is updated in response to a successful verification of the signature in the first function.

According to an embodiment of the computing system, the memory unit may further comprise instructions that when executed by the processor perform actions of, in response to identifying a use of the local variable in the first function, checking the first flag and triggering an event if the first flag indicates the local variable is uninitialized.

According to an embodiment of the computing system, wherein the first flag is passed to the second function before execution of the second function, and wherein the execution of the second function comprises: initially setting the second flag based at least on the first flag; in response to an initialization of the parameter, setting the second flag to indicate the parameter has been initialized; and in response to identifying a use of the parameter in the second function, checking the second flag and triggering an event if the second flag indicates the parameter is uninitialized.

According to an embodiment of the computing system, wherein the first function further comprises a third flag associated with a parameter of the first function for indicating an initialization state of the parameter in the first function, wherein the parameter of the first function is passed from a third function that calls the first function.

According to another embodiment of the present invention, there is provided a computer program product comprising a computer readable storage medium having program instructions embodied therewith. The program instructions may be executable by a processor to cause the processor to run a first function, wherein the first function comprises a local variable and a first flag associated with the local variable for indicating an initialization state of the local variable; call a second function from the first function, with the local variable as a parameter of the second function, wherein the second function comprises a second flag associated with the parameter for indicating an initialization state of the parameter; and update the first flag based at least on the second flag returned from the second function.

According to an embodiment of the computer program product, wherein during execution of the second function, the second flag is initially set to indicate the parameter is uninitialized, and is set to indicate the parameter has been initialized in response to an initialization of the parameter.

According to an embodiment of the computer program product, wherein updating the first flag based at least on the second flag returned from the second function comprises: setting the first flag to indicate the local variable has been initialized if the returned second flag indicates the parameter has been initialized; and keeping the first flag unchanged if the returned second flag indicates the parameter is uninitialized.

According to an embodiment of the computer program product, wherein the second flag is returned to the first function by putting the second flag into a stack frame associated with the second function at an end of the second function according to a predetermined convention between the first and second functions.

According to an embodiment of the computer program product, wherein a global variable is provided to indicate availability of the second flag to the first function, and wherein the first flag is updated in response to the global variable indicating the second flag is available to the first function.

According to an embodiment of the computer program product, wherein a signature of the second function is returned to the first function along with the second flag, and wherein the first flag is updated in response to a successful verification of the signature in the first function.

According to an embodiment of the computer program product, the program instructions executable by the processor may further cause the processor to, in response to identifying a use of the local variable in the first function, check the first flag and triggering an event if the first flag indicates the local variable is uninitialized.

According to an embodiment of the computer program product, wherein the first flag is passed to the second function before execution of the second function, and wherein the execution of the second function comprises: initially setting the second flag based at least on the first flag; in response to an initialization of the parameter, setting the second flag to indicate the parameter has been initialized; and in response to identifying a use of the parameter in the second function, checking the second flag and triggering an event if the second flag indicates the parameter is uninitialized.

According to an embodiment of the computer program product, wherein the first function further comprises a third flag associated with a parameter of the first function for indicating an initialization state of the parameter in the first function, wherein the parameter of the first function is passed from a third function that calls the first function.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer implemented method for detecting uninitialized variables, the computer implemented method comprising:
running a first function, wherein the first function comprises a local variable and a first flag associated with the local variable for indicating an initialization state of the local variable;
calling a second function from the first function, with the local variable as a parameter of the second function, wherein the second function comprises a second flag associated with the parameter for indicating an initialization state of the parameter;
in response the local variable not indicating the initialization state of the parameter, providing a global variable to the second function as a second parameter, wherein the global variable indicates the availability state of the second flag to the first function;
in response to the second flag to the first function determined as available, returning the second flag from the second function to the first function; and
updating the first flag based at least on the second flag and the global variable being available, wherein the global variable is associated with the second flag returned to the first function from the second function.

2. The computer implemented method of claim 1, wherein during execution of the second function, the second flag is initially set to indicate the parameter is uninitialized, and is set to indicate the parameter has been initialized in response to an initialization of the parameter.

3. The computer implemented method of claim 1, wherein updating the first flag based at least on the second flag returned from the second function comprises:
setting the first flag to indicate the local variable has been initialized if the returned second flag indicates the parameter has been initialized; and
keeping the first flag unchanged if the returned second flag indicates the parameter is uninitialized.

4. The computer implemented method of claim 1, wherein the second flag is returned to the first function by putting the second flag into a stack frame associated with the second function at an end of the second function according to a predetermined convention between the first and second functions.

5. The computer implemented method of claim 1, wherein a signature of the second function is returned to the first function along with the second flag, and wherein the first flag is updated in response to a successful verification of the signature in the first function.

6. The computer implemented method of claim 1, further comprising: in response to identifying a use of the local variable in the first function, checking the first flag and triggering an event if the first flag indicates the local variable is uninitialized.

7. The computer implemented method of claim 1, wherein the first flag is passed to the second function before execution of the second function, and wherein the execution of the second function comprises:
initially setting the second flag based at least on the first flag;
in response to initializing the parameter, setting the second flag to indicate the parameter has been initialized; and
in response to identifying a use of the parameter in the second function, checking the second flag and triggering an event if the second flag indicates the parameter is uninitialized.

8. The computer implemented method of claim 1, wherein the first function further comprises a third flag associated with a parameter of the first function for indicating an initialization state of the parameter in the first function, wherein the parameter of the first function is passed from a third function that calls the first function.

9. A computer program product for detecting uninitialized variables, the computer program product comprising:
one or more computer-readable storage media and program instructions stored on the one or more computer-readable storage media, the program instructions comprising:
instructions to run a first function, wherein the first function comprises a local variable and a first flag associated with the local variable for indicating an initialization state of the local variable;
instructions to call a second function from the first function, with the local variable as a parameter of the second function, wherein the second function comprises a second flag associated with the parameter for indicating an initialization state of the parameter;
in response the local variable not indicating the initialization state of the parameter, program instructions to provide a global variable to the second function as a second parameter, wherein the global variable indicates the availability state of the second flag to the first function;
program instructions to determine an availability state of the second flag to the first function based on the global variable;
in response to the second flag to the first function determined as available, program instructions to return the second flag from the second function to the first function; and
instructions to update the first flag based at least on the second flag and the global variable being available, wherein the global variable is associated with the second flag returned to the first function from the second function.

10. The computer program product of claim 9, wherein during execution of the second function, the second flag is initially set to indicate the parameter is uninitialized, and is set to indicate the parameter has been initialized in response to an initialization of the parameter.

11. The computer program product of claim 9, wherein instructions to update the first flag based at least on the second flag returned from the second function comprises:

instructions to set the first flag to indicate the local variable has been initialized if the returned second flag indicates the parameter has been initialized; and instructions to keep the first flag unchanged if the returned second flag indicates the parameter is uninitialized.

12. The computer program product of claim 9, wherein the second flag is returned to the first function by putting the second flag into a stack frame associated with the second function at an end of the second function according to a predetermined convention between the first and second functions.

13. The computer program product of claim 9, wherein a signature of the second function is returned to the first function along with the second flag, and wherein the first flag is updated in response to a successful verification of the signature in the first function.

14. The computer program product of claim 9, further comprising: in response to instructions to identify a use of the local variable in the first function, instructions to check the first flag and triggering an event if the first flag indicates the local variable is uninitialized.

15. The computer program product of claim 9, wherein the first flag is passed to the second function before execution of the second function, and wherein the execution of the second function comprises:

instructions to initially set the second flag based at least on the first flag;

in response to instructions to initialize the parameter, instructions to set the second flag to indicate the parameter has been initialized; and in response to instructions to identify a use of the parameter in the second function, instructions to check the second flag and instructions to trigger an event if the second flag indicates the parameter is uninitialized.

16. The computer program product of claim 9, wherein the first function further comprises a third flag associated with a parameter of the first function for indicating an initialization state of the parameter in the first function, wherein the parameter of the first function is passed from a third function that calls the first function.

17. A computer system for detecting uninitialized variables, the computer system comprising:

one or more computer processors;

one or more computer-readable storage media;

program instructions stored on the computer-readable storage media for execution by at least one of the one or more processors, the program instructions comprising:

instructions to run a first function, wherein the first function comprises a local variable and a first flag associated with the local variable for indicating an initialization state of the local variable;

instructions to call a second function from the first function, with the local variable as a parameter of the second function, wherein the second function comprises a second flag associated with the parameter for indicating an initialization state of the parameter;

in response the local variable not indicating the initialization state of the parameter, program instructions to provide a global variable to the second function as a second parameter, wherein the global variable indicates the availability state of the second flag to the first function;

program instructions to determine an availability state of the second flag to the first function based on the global variable;

in response to the second flag to the first function determined as available, program instructions to return the second flag from the second function to the first function; and instructions to update the first flag based at least on the second flag and the global variable being available, wherein the global variable is associated with the second flag returned to the first function from the second function.

18. The computer system of claim 17, wherein during execution of the second function, the second flag is initially set to indicate the parameter is uninitialized, and is set to indicate the parameter has been initialized in response to an initialization of the parameter.

19. The computer system of claim 17, wherein instructions to update the first flag based at least on the second flag returned from the second function comprises:

instructions to set the first flag to indicate the local variable has been initialized if the returned second flag indicates the parameter has been initialized; and instructions to keep the first flag unchanged if the returned second flag indicates the parameter is uninitialized.

20. The computer system of claim 17, wherein the second flag is returned to the first function by putting the second flag into a stack frame associated with the second function at an end of the second function according to a predetermined convention between the first and second functions.

* * * * *